US008824365B2

(12) United States Patent
Xu et al.

(10) Patent No.: US 8,824,365 B2
(45) Date of Patent: Sep. 2, 2014

(54) METHOD FOR ESTABLISHING CONNECTION BY HNB

(75) Inventors: Lixiang Xu, Beijing (CN); Chunying Sun, Beijing (CN); Hong Wang, Beijing (CN); Xiaoqiang Li, Beijing (CN)

(73) Assignees: Samsung Electronics Co., Ltd., Suwon-si (KR); Beijing Samsung Telecom R&D Center, Beijing (CN)

( * ) Notice: Subject to any disclaimer, the term of this patent is extended or adjusted under 35 U.S.C. 154(b) by 502 days.

(21) Appl. No.: 12/677,382

(22) PCT Filed: Aug. 28, 2008

(86) PCT No.: PCT/KR2008/005054
§ 371 (c)(1),
(2), (4) Date: Mar. 10, 2010

(87) PCT Pub. No.: WO2009/045001
PCT Pub. Date: Apr. 9, 2009

(65) Prior Publication Data
US 2011/0032871 A1 Feb. 10, 2011

(30) Foreign Application Priority Data
Sep. 29, 2007 (CN) .......................... 2007 1 0164107

(51) Int. Cl.
*H04W 4/00* (2009.01)
(52) U.S. Cl.
USPC ....................... 370/328; 455/435.1
(58) Field of Classification Search
None
See application file for complete search history.

(56) References Cited

U.S. PATENT DOCUMENTS

| 8,072,953 | B2 * | 12/2011 | Mukherjee et al. | 370/338 |
| 2002/0131407 | A1 * | 9/2002 | Muhonen | 370/352 |
| 2007/0097939 | A1 | 5/2007 | Nylander et al. | |
| 2007/0270152 | A1 | 11/2007 | Nylander et al. | |
| 2008/0076420 | A1 * | 3/2008 | Khetawat et al. | 455/435.1 |
| 2008/0220782 | A1 * | 9/2008 | Wang et al. | 455/436 |
| 2009/0047960 | A1 * | 2/2009 | Gunnarsson et al. | 455/436 |
| 2009/0047968 | A1 * | 2/2009 | Gunnarsson et al. | 455/446 |
| 2009/0052350 | A1 * | 2/2009 | Chen et al. | 370/255 |
| 2009/0104905 | A1 * | 4/2009 | DiGirolamo et al. | 455/434 |
| 2011/0269465 | A1 * | 11/2011 | Xu et al. | 455/436 |
| 2011/0274086 | A1 * | 11/2011 | Xu | 370/331 |
| 2011/0274276 | A1 * | 11/2011 | Xu | 380/272 |
| 2011/0314162 | A1 * | 12/2011 | Xu et al. | 709/227 |
| 2012/0083273 | A1 * | 4/2012 | Mukherjee et al. | 455/436 |

FOREIGN PATENT DOCUMENTS

KR 10-2008-0040655 A 5/2008

OTHER PUBLICATIONS

Holger Claussen, Performance of Macro-and Co-Channel Femtocells in a Hierarchical Cell Structure, Proc. of the 18th Annual IEEE International Symposium of Personal, Indoor and Mobile Radio Communications, Sep. 3, 2007.

* cited by examiner

*Primary Examiner* — Anh-Vu Ly
(74) *Attorney, Agent, or Firm* — Jefferson IP Law, LLP

(57) ABSTRACT

A method for establishing a connection of a home Node B (HNB), the method comprising the steps of: transmitting, by the HNB, an attachment request message including an identifier of a closed subscriber group (CSG) where the HNB is located and information on location of the HNB to an operation and maintenance center (OMC); selecting, by the OMC a device establishing a connection with the HNB using the information on location of the HNB; transmitting, by the OMC, an attachment response message including information on the device to the HNB; establishing, by the HNB, a connection with the selected device. With the method proposed in the present invention, a UE can switch between HNBs in the same CSG through interface X2. Meanwhile, such information as the radio resource management and so on can be exchanged between two HNBs.

16 Claims, 7 Drawing Sheets

METHOD FOR ESTABLISHING CONNECTION BY HNB

BACKGROUND OF THE INVENTION

1. Field of the Invention

The present invention generally relates to communication technology, especially to a method for accessing a network by an HNB (home Node B).

2. Description of the Related Art

A system structure of Service Architecture Evolution (hereinafter referred to as SAE) is illustrated in FIG. 1. The system structure of SAE in FIG. 1 is described as following.

User Equipment (hereinafter referred to as UE) 101 is a terminal device used to receive data. Enhanced UTRAN (hereinafter referred to as EUTRAN) 102, also called ENB (Enhanced Node B), is a radio access network of the Long Term Evolution (LTE) SAE, for providing interface through which an LTE mobile station accesses the radio network. Through interface S1, EUTRAN connects to a mobility management entity (MME) 103 and a user plane entity Serving Gateway 104 in the mobile station. MME 103 is adapted for managing mobile context, session context for the UE, and holding user information on security. Serving Gateway 104 primarily provides a function of user plane. An interface S1-MME is adapted for establishing radio access bearer, forwarding messages from UE to MME through a wireless access network. The combination of MME 103 and Serving Gateway 104 is similar to the original SGSN (general packet radio service (GPRS) supporting node) 106. It is possible that both MME and Serving Gateway locate at the same physical entity. PDN Gateway 105 is adapted for the functions like accounting, legally monitoring, etc. And it is possible that both the Serving Gateway and the PDN Gateway locate at the same physical entity. SGSN 106 provides routing for data transmission in existing UMTS. An existing SGSN finds a corresponding gateway GPRS supporting node (GGSN) according to an access point name (APN). HSS 107 is a home subscription sub-system for the UE and is adapted for storing user information such as the current location of UE, address of the serving node, security information on the user, activated packet data protocol (PDP) context for the UE and so on. PCRF (Policy Control and Charging Rules Function) 108 provides QoS policy and accounting rules through interface S7.

In general, a user data stream reaches the Serving Gateway 104 through PDN Gateway 105. Then, through the GPRS tunnel protocol (GTP) channel, data is sent by the Serving Gateway to the ENB where the UE locates in, and now it is sent by the ENB to corresponding UE.

HNB refers to a Node B applied in a home. It also can be applied in such site as a university, a company and so on. HNB is a plug and play device. Difference between an HNB and a general macro node B is that: in general not all UEs can access an HNB. For example, only the UEs in a user's home or that are allowed to access the HNB can access the corresponding HNB. And for the HNB in a company, only the company's staff and its allowed partners can access the HNB. The HNB group (e.g., the HNB in a company) bearing the same access subscriber cluster is called CSG (closed subscriber group). No interface X2 (interface between Node Bs in SAE) exists between general HNBs (e.g., the HNBs in homes) or between an HNB and a macro Node B. Through interface S1, a UE switches between HNBs or between an HNB and a macro Node B.

For an HNB applied in a company or university or the like, a UE frequently moves between two HNBs in the same company. In this case, the switch is always implemented through interface S1 so that great delay causes and efficiency is very poor. In addition, information such as radio resource management and so on cannot be exchanged between two HNBs in the same company so that resources cannot be utilized effectively.

SUMMARY OF THE INVENTION

The object of this invention is to provide a method for establishing a connection by a Home Node B (HNB).

To achieve the object mentioned above, A method for establishing a connection of a home Node B (HNB), the method comprising the steps of: transmitting, by the HNB, an attachment request message including an identifier of a closed subscriber group (CSG) where the HNB is located and information on location of the HNB to an operation and maintenance center (OMC); selecting, by the OMC a device establishing a connection with the HNB using the information on location of the HNB; transmitting, by the OMC, an attachment response message including information on the device to the HNB; establishing, by the HNB, a connection with the selected device.

With the method proposed in the present invention, a UE can switch between HNBs in the same CSG through interface X2. Meanwhile, such information as the radio resource management and so on can be exchanged between two HNBs.

DETAILED DESCRIPTION OF THE PREFERRED EMBODIMENTS

Figure 1:
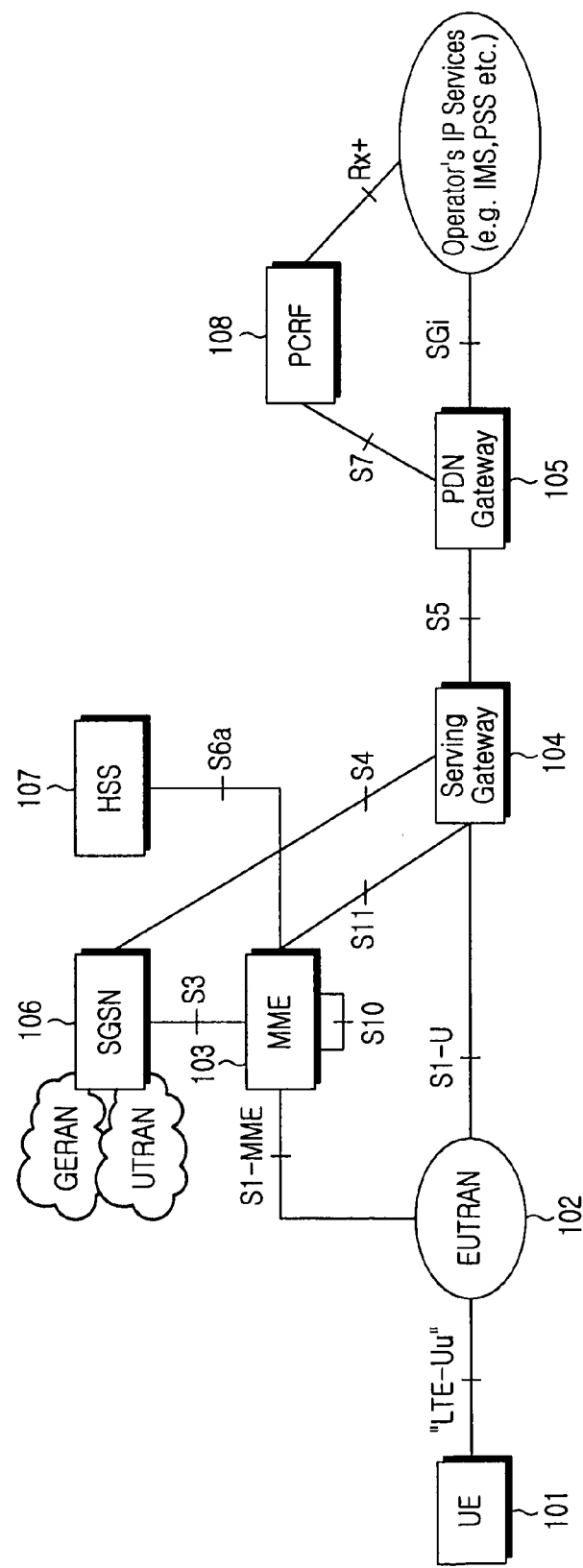
FIG. 1 shows a network structure of SAE.
Figure 2:
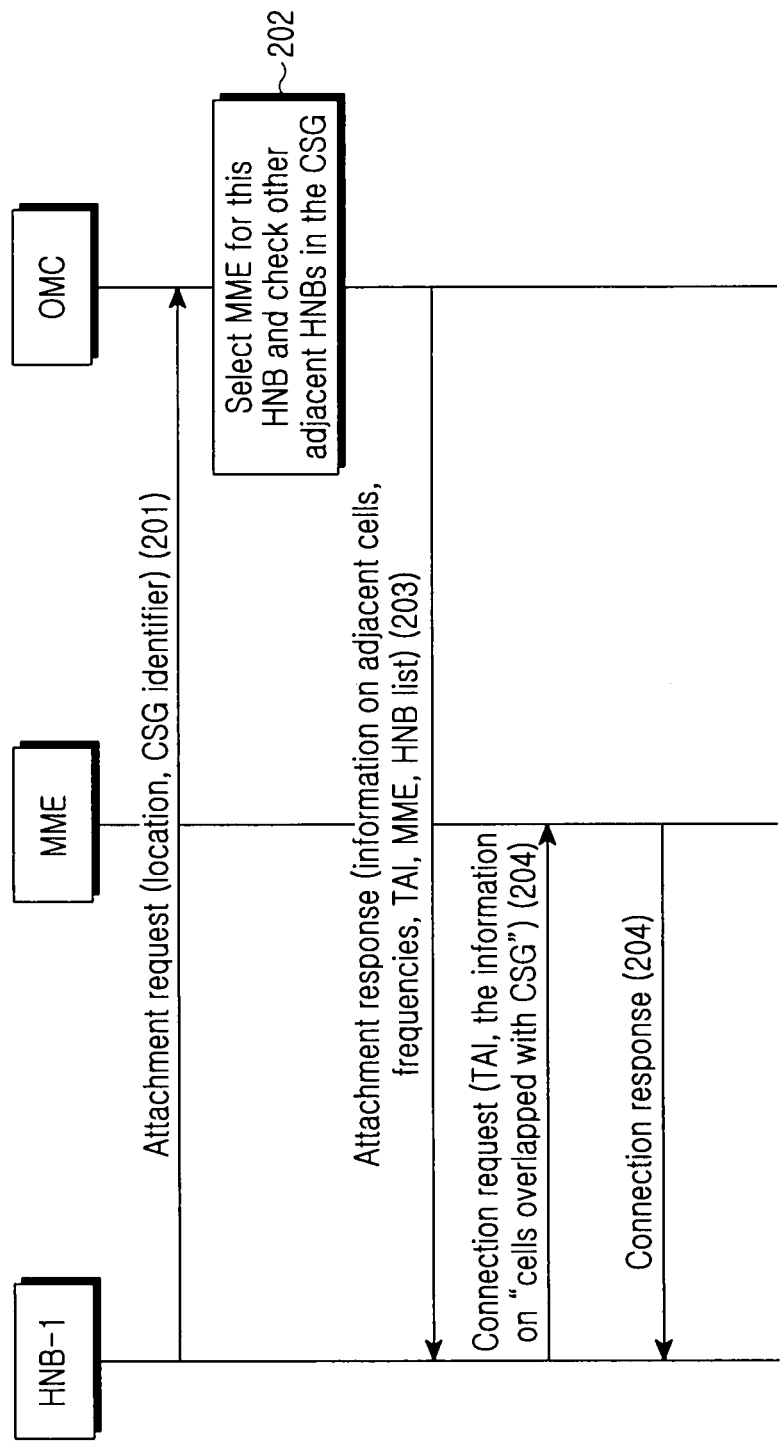
FIG. 2 shows a process that a connection is established for HNB in embodiment 1 of present invention.

An embodiment 1 of the present invention is illustrated in FIG. 2. Following is a detailed description with reference to FIG. 2. Detailed technical description for the known components is omitted. In this embodiment, within a CSG, HNB1 is a first HNB that accesses the network.

In step 201, HNB1 transmits an "attachment request" message to the OMC. This message contains information on a location of the HNB. Optionally, the "attachment request" message contains an identifier of the CSG to which the HNB belongs. Optionally, the network assigns the CSG identifier to HNB (the first HNB or the first group of HNBs within the CSG) when HNB signs in, or knows the identifier of the CSG to which the HNB (not the first signed in group of HNBs in the CSG) belongs when HNB signs in.

In step 202, OMC selects an MME for the HNB. Within the CSG, the HNB is the first one that accesses the network. OMC selects an MME for it among the MMEs adjacent to the HNB according to a certain rule such as for balancing the load, reducing a possibility of changing MME when UE moves, and so on. Optionally, OMC may select an S-GW for the HNB according to the same rule as on the selection of MME. HNB and OMC check other HNBs in the CSG, which need to establish X2 connection with the HNB. According to the CSG identifier, OMC checks other HNBs in the CSG, which need to establish X2 connection with the HNB. Optionally, the addresses of the HNBs are considered when OMC checks other HNBs in the CSG, which need to establish X2 connection with the HNB. For example, it is not necessary to establish interface X2 between two HNBs if the two HNBs that are in different countries but in the same company belong to the same CSG. In this embodiment, no other HNB exists in the CSG.

The process of selecting S-GW for HNB can be implemented by the MME connected to the HNB when data is transferred through the HNB. Therefore, the HNBs in the same CSG connect to the same S-GW. If it is necessary for the first HNB in the CSG to establish the user plane, MME selects an S-GW for the CSG according to such rules as to balance load or to reduce the possibility of changing S-GW when a UE moves, and so on.

In step 203, OMC transmits an "attachment response" message to the HNB. This message indicates the MME selected by the OMC for the HNB. Optionally, this message indicates other HNBs necessary to establish X2 connection and adjacent to the HNB. Optionally, the message contains the frequency for using the HNB. The "attachment response" message contains the information on adjacent cells. The "attachment response" message contains a track area identifier (TAI) for the HNB. The "attachment response" message contains the identifier assigned to the HNB. Optionally, the message contains an address of the S-GW that OMC selected for the HNB.

In step 204, HNB initiates a process to establish a connection with the MME indicated by the message. HNB transmits a "connection request" message to MME. The message contains the information on "cells which are overlapped with HNB or CSG". Optionally, the message contains an information element of the identifier of the TAI where HNB locates in. Optionally, the message contains the information element of the identifier of HNB. Optionally, the message contains the information element of the identifier of the CSG where HNB locates. MME transmits a "connection response" message to HNB.

Figure 3:
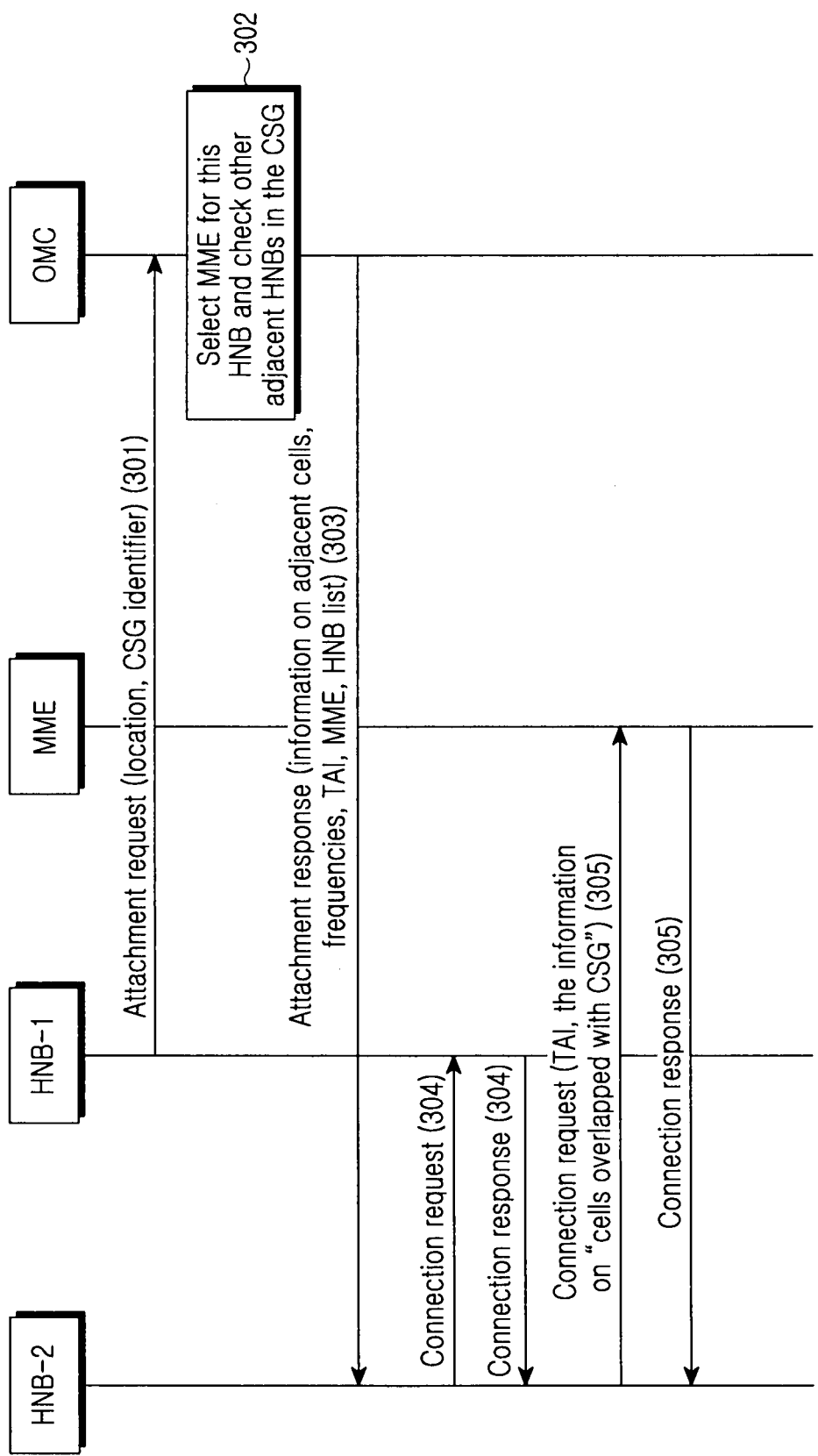
FIG. 3 shows the process that a connection is established for HNB in embodiment 2 of present invention.

Embodiment 2 of the present invention is illustrated in FIG. 3. Following is detailed description to the figure. Detailed technical description for known components is omitted. In this embodiment, HNB1 and HNB2 belong to the same CSG. HNB1 has accessed the network. And HNB2 begins to access the network for a first time.

In step 301, HNB2 transmits the "attachment request" message to the OMC. This message contains the information on the location of HNB2. Optionally, the "attachment request" message contains the identifier of the CSG to which the HNB2 belongs. Optionally, the network knows the identifier of the CSG to which the HNB belongs when HNB signs in.

In step 302, OMC selects an MME for the HNB. If the HNB is not the first to access the network in the CSG, the MME selected by OMC for other HNBs in this CSG is just the one that the HNB should connect to. In this embodiment, OMC assigns both the MME and the S-GW selected for HNB1 to the HNB. Optionally, the address the HNB should be considered when OMC selects MME for the HNB. For example, if two HNBs that are in different countries but in the same company belong to the same CSG, they may not be able to connect to the same MME. In this case, if no adjacent HNB accesses the network, OMC checks that this HNB is the first one which accesses the network in the CSG and selects an MME for it according to rules such as balancing load or reducing possibility of changing MME when a UE moves, and so on. Optionally, selection of S-GW for the HNB can be implemented by OMC according to the same rules on the selection of MME. OMC checks other HNBs in the CSG, which need to establish X2 connection with the HNB. And according to the CSG identifier, OMC checks other HNBs in the CSG which need to establish X2 connection with the HNB. Optionally, the addresses of the HNBs, as well as whether the HNBs share the same CSG or not, are considered when OMC checks other HNBs in the CSG which need to establish X2 connection with the HNB. For example, it is not necessary to establish interface X2 between two HNBs if the two HNBs that are in different countries but in the same company belong to the same CSG. In this embodiment, for example, it is necessary to establish X2 connection between HNB1 and HNB2.

The process of selecting S-GW for HNB can be implemented by the MME connected to the HNB when data is transferred through the HNB. Therefore, the HNBs in the same CSG connect to the same S-GW. If it is necessary for the first HNB in the CSG to establish the user plane, MME selects an S-GW for the CSG according to such rules as to balance load or to reduce the possibility of changing S-GW when a UE moves, and so on. If the HNB is not the first necessary to establish a user plane in the CSG, the S-GW selected by MME for other HNBS in this CSG is just the one that the HNB should connect to.

In step 303, OMC transmits the "attachment response" message to the HNB2. This message indicates the MME that the OMC selected for the HNB. And the MME information included in the message may be the IP address of the MME. Optionally, this message contains a list of other HNBs necessary to establish X2 and adjacent to the HNB. The HNB list information included in the message is an IP address list for the HNB. Optionally, the message contains a frequency for using the HNB. The "attachment response" message contains the information on adjacent cells. The "attachment response" message contains the track area identifier (TAI) for the HNB. The "attachment response" message contains the identifier assigned to the HNB. Optionally, the message contains the address of the S-GW that OMC selected for the HNB.

In step 304, HNB2 initiates a process to establish a connection with the HNB indicated by the message. HNB2 transmits the "connection request" message to the other HNB (e.g., HNB1). HNB1 transmits the "connection response" message to HNB2.

In step 305, HNB2 initiates a process to establish a connection with the MME indicated by the message. HNB2 transmits the "connection request" message to MME. The message contains the information on "cells which are overlapped with the HNB or CSG". The message contains the information element of the identifier of the TAI where HNB locates. Optionally, the message contains the information element of the identifier of HNB. Optionally, the message contains the information element of the identifier of the CSG where HNB locates. MME transmits the "connection response" message to HNB2.

The sequence of performing step 304 and step 305 is not limited.

Figure 4:
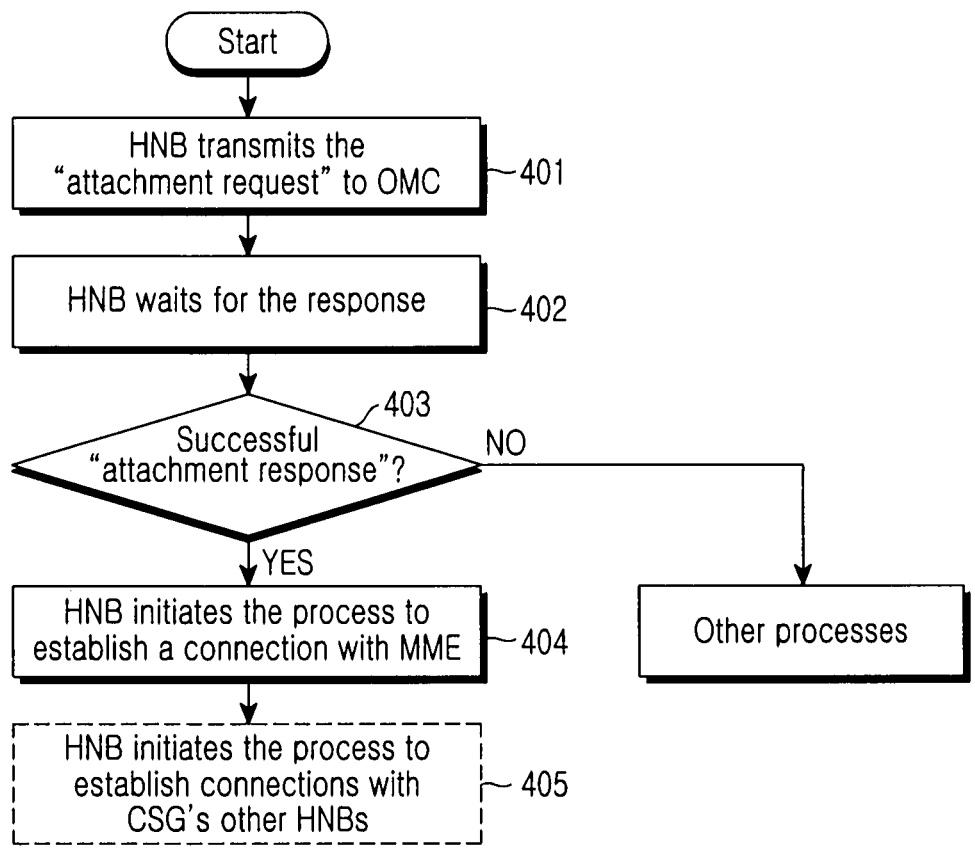
FIG. 4 shows an operation flows at HNB according to embodiment 1 and embodiment 2 respectively.

In this embodiment, the operation flow of HNB is illustrated in FIG. 4. Here, detailed technical description for known components is omitted.

In step 401, HNB transmits the "attachment request" message to the OMC. This message contains the information on the location of HNB. Optionally, the "attachment request" message contains the identifier of the CSG to which the HNB2 belongs. In step 402, HNB waits for the response message. In step 403, if HNB receives a "successful attachment response" message, it saves the information that is included in the message, such as information on MME and the information on other HNBs, TAI, the HNB identifier and so on. In step 404, HNB initiates the process to establish a connection with the MME indicated by the message. HNB transmits the "connection request" message to MME. Optionally, the message contains the information on "cells which are overlapped with the HNB or CSG". Optionally, the message contains the information element of the identifier of the TAI where HNB locates. Optionally, the message contains the information element of the identifier of HNB. Optionally, the message contains the information element of the identifier of the CSG where HNB locates. MME transmits the "connection response" message to HNB. In step 405 Optionally, if the "attachment response" message contains information on other HNBs, such as HNB IP address list, HNB initiates the process to establish connections with other HNBs. HNB transmits the "connection request" to another HNB. Another HNB transmits the "connection response" message to the HNB.

The sequence of performing step 404 and step 405 is not limited.

Figure 5:
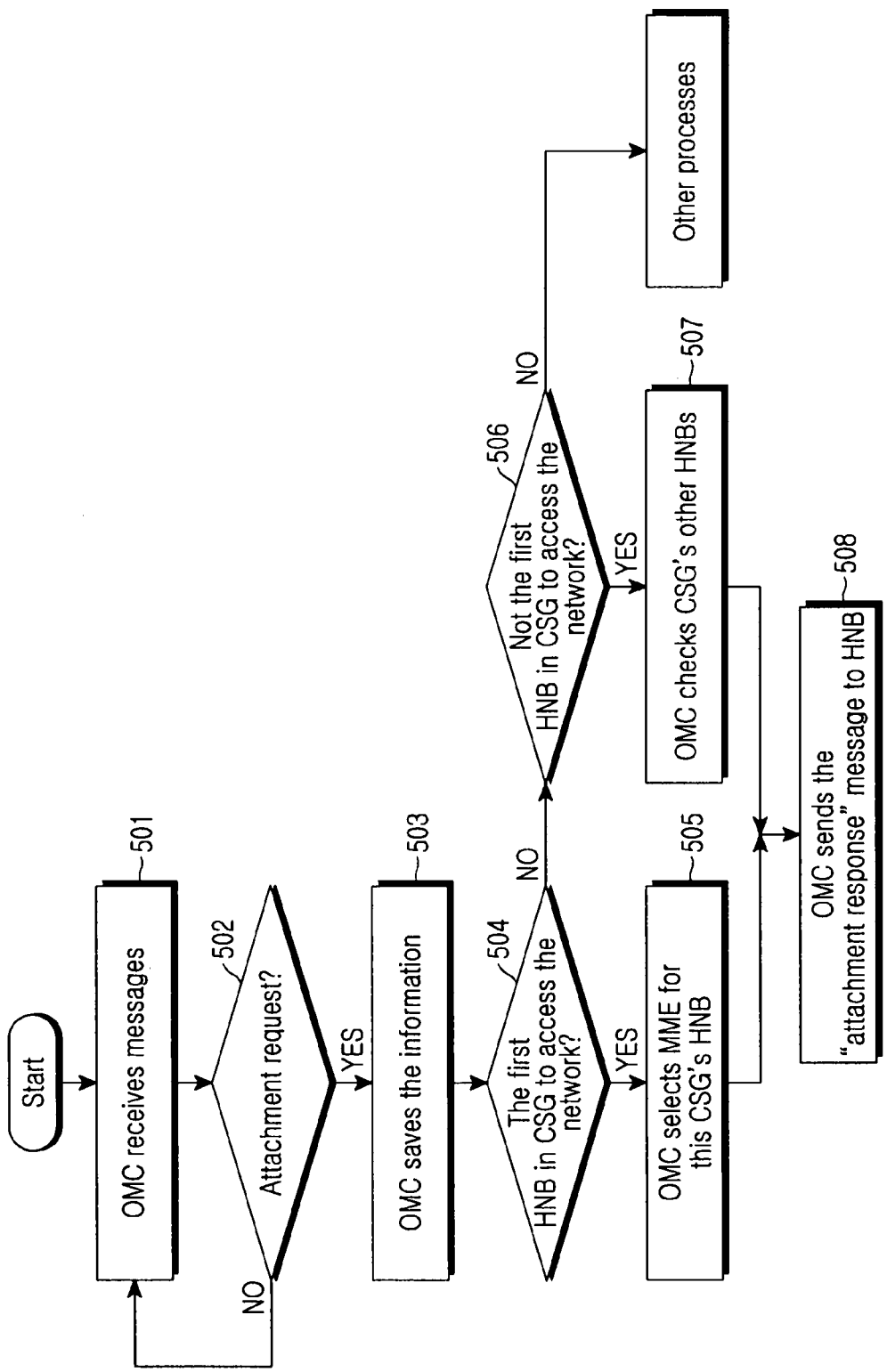
FIG. 5 shows an operation flows at OMC according to embodiment 1 and embodiment 2 respectively.

In this embodiment, the operation flow of OMC is illustrated in FIG. 5. Here, detailed technical description for known components is omitted.

In step 501, OMC receives messages. In step 502, if OMC receives the "attachment request" message from HNB, in step 503 it saves HNB related information. And if the message contains the location information for HNB, OMC saves this information. And if the message contains the identifier of the CSG where the HNB belongs, OMC saves this information.

In step 504, if the HNB is the first to access the network in corresponding CSG, in step 505, OMC selects an MME for HNB in this CSG. OMC selects the MME according to either the address of HNB, or the rule to balance load or to reduce the possibility of changing MME when a UE moves, etc. Optionally, OMC can select an S-GW for the HNB according to the same rule as on the selection of MME.

In step 506, if HNB is not the first to access the network in the CSG, OMC 507 checks other HNBs in the CSG. OMC 508 transmits the "attachment response" message to the requesting HNB. And information on the MME OMC selected for HNB in this CSG is included in the message. Optionally, the "attachment response" message contains the information on the S-GW selected by OMC for HNB in this CSG. Optionally, the message contains the information on other HNBs in this CSG, such as the IP address list for the HNB. Optionally, the message contains the identifier of the TAI where the HNB locates. Optionally, the message contains the HNB identifier allocated to the HNB. The case described above is for that the HNBs in the CSG are not far away from one another. In another case, for example, two HNBs belong to the same CSG in different countries but in the same company, if no adjacent HNB accesses the network, OMC thinks that this HNB is the first one which accesses the network in the CSG and selects an MME for it according to such rules as to balance load or to reduce possibility of changing MME when a UE moves, and so on. Optionally, OMC can select an S-GW for the HNB according to the same rule as on the selection of MME. In this case, OMC finds the other HNB is the one necessary to establish a X2 connection with the HNB in the CSG according to not only the CSG ID. Meanwhile, it should consider the location of the HNB. For example, it is not necessary to establish interface X2 between two HNBs if the two HNBs that are in different countries but in the same company belong to the same CSG.

Figure 6:
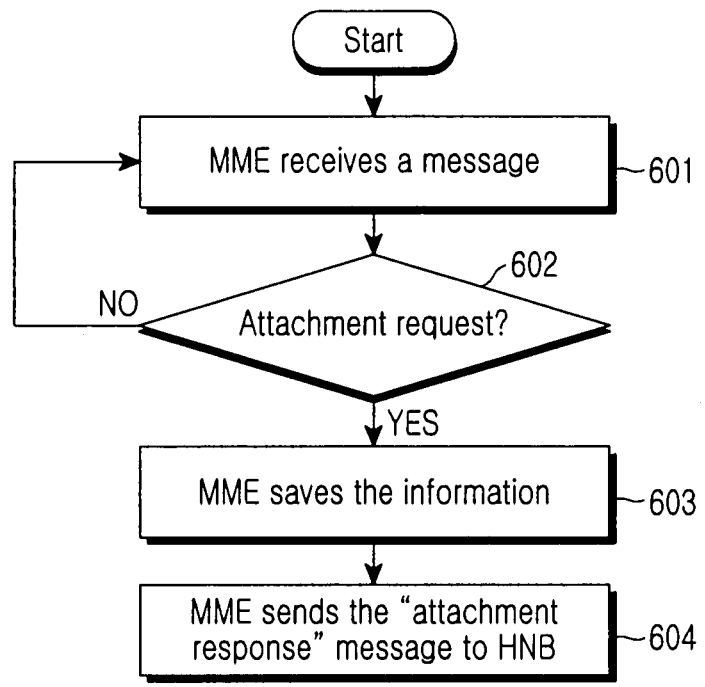
FIG. 6 shows an operation flows at MME according to embodiment 1 and embodiment 2 respectively.

In this embodiment, the operation flow of MME is illustrated in FIG. 6. Here, detailed technical description for the known components is omitted.

In step 601 MME receives messages. In step 602 if MME receives the "connection request" message from HNB, in step 603 MME saves the information which is included in this message, such as the information on "cells which is overlapped with the HNB or CSG", the identifier of the TAI where HNB locates, the HNB identifier. MME 604 transmits the "connection response" message to HNB.

Figure 7:
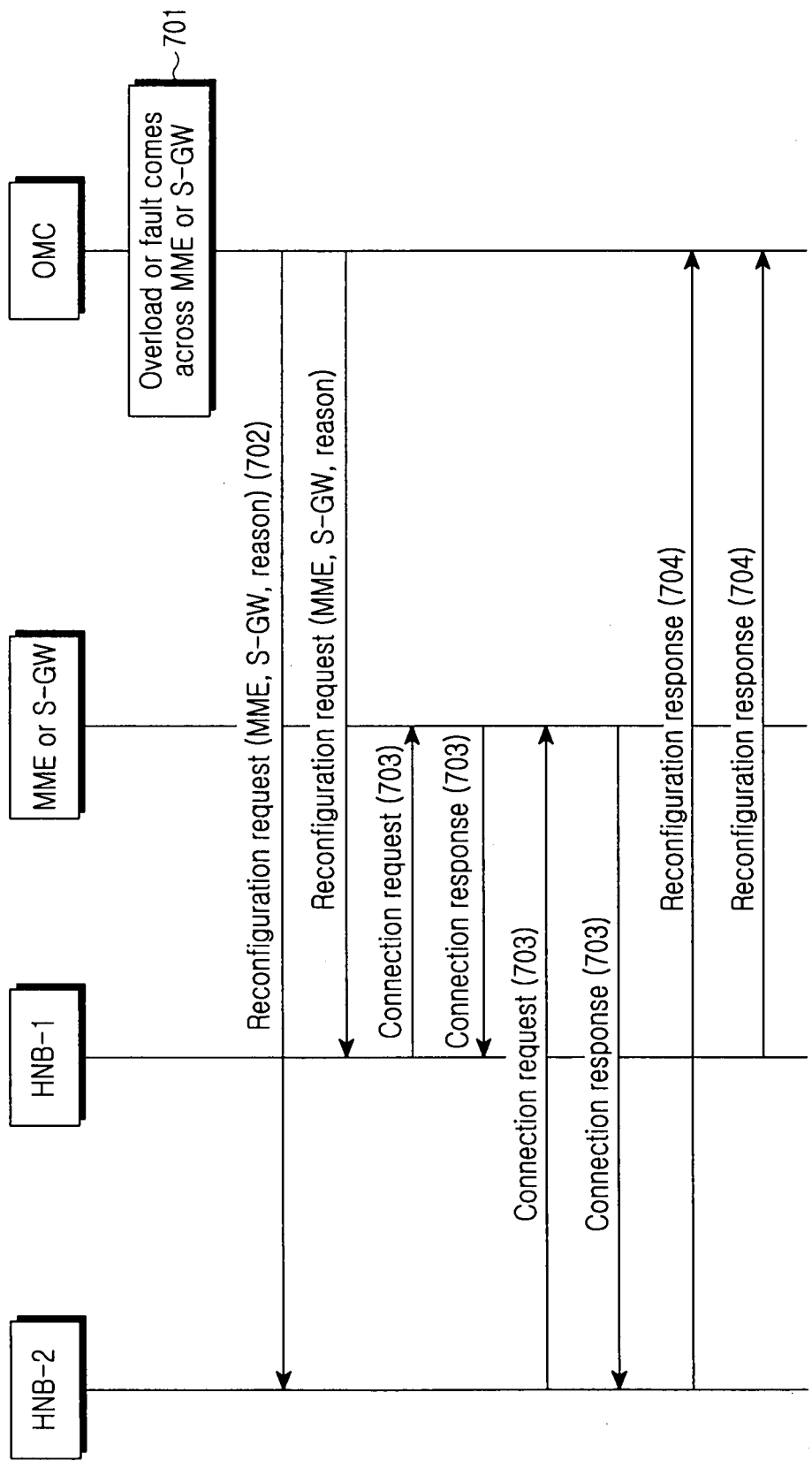
FIG. 7 shows a process of reconfiguring MME or S-GW.

FIG. 7 illustrates the process that OMC reconfigures CSG's MME or S-GW when overload or fault comes across the MME or the S-GW.

In step 701, OMC finds that overload or fault comes across the MME or S-GW connected to a certain CSG.

In step 702, OMC transmits a "reconfiguration request" message to the HNB in CSG. In this message, the information on the reconfigured MME or S-GW and the reason for the reconfiguration are included. And the reconfiguration can be done to the IP address of the MME or the S-GW.

In step 703, the HNB that has received the "reconfiguration request" message transmits the "connection request" message to the new MME or S-GW. Optionally, the "connection request" message sent to MME includes the information on "cells, which are overlapped with the HNB or CSG". Optionally, the "connection request" message sent to MME contains the information element of the identifier of the TAI where HNB locates. The new MME or S-GW transmits the "connection response" message to the HNB.

In step 704, the HNB transmits a "reconfiguration response" message to OMC.

Optionally, if the reconfiguration results from the overload of MME or S-GW, HNB initiates the process of releasing the connection with original MME or S-GW.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for establishing a connection of a Home Node B (HNB) by an Operation and Maintenance Center (OMC), the method comprising steps of:
   receiving, from the HNB, an attachment request message including an identifier of a Closed Subscriber Group (CSG) where the HNB is located and information on a location of the HNB;
   if the HNB is first from the CSG to access a network, selecting a device establishing a connection with the HNB using the information on the location of the HNB, and
   transmitting, to the HNB, an attachment response message including information on the device for establishing a connection between the selected device and the HNB and information necessary to establish an interface X2 for switching of HNBs in the CSG.

2. The method according to claim 1, wherein the step of selecting the device establishing the connection with the HNB comprises:
   selecting a Mobile Management Entity (MME) or a Serving Gateway (S-GW) according to one of the location of the HNB, load balancing, and a rule of reducing a possibility of changing the MME or the S-GW when an user equipment(UE) moves, wherein the information on the device indicates the selected MME or S-GW.

3. The method according to claim 1, further comprising:
if the HNB has not accessed the network in the CSG, selecting a Mobile Management Entity (MME) or a Serving Gateway (S-GW) selected by the OMC for other HNBs in the CSG as the device, and
transmitting, to the other HNBs, an attachment response message including information on the selected device.

4. The method according to claim 1, wherein the attachment response message includes an Internet Protocol (IP) address list of each of other HNBs in the CSG and information on other HNBs adjacent to the HNB.

5. A method for establishing a connection of a Home Node B (HNB), the method comprising steps of:
transmitting an attachment request message including an identifier of a Closed Subscriber Group (CSG) where the HNB is located and information on a location of the HNB to an Operation and Maintenance Center (OMC); and
receiving an attachment response message including information on a device establishing the connection with the HNB selected using the information on the location of the HNB, and establishing a connection with the selected device,
wherein the attachment response message includes information necessary to establish an interface X2 for switching of HNBs in the CSG.

6. The method according to claim 5, wherein the information on the device indicates a Mobile Management Entity (MME) or a Serving Gateway (S-GW) selected according to one of the location of the HNB, load balancing, and a rule of reducing a possibility of changing the MME or the S-GW when an user equipment (UE) moves.

7. The method according to claim 6, wherein if the information on the device indicates the MME, transmitting, a connection request message including an identifier of the HNB and an identifier of a Track Area Identifier (TAI) where the HNB is located, to the MME; and
receiving from the MME, a connection response message.

8. The method according to claim 7, wherein the connection request message includes information on cells which are overlapped with the HNB or the CSG.

9. An Operation and Maintenance Center (OMC) for establishing a connection of a Home Node B (HNB), the OMC comprising:
a receiver for receiving, from the HNB, an attachment request message including an identifier of a Closed Subscriber Group (CSG) where the HNB is located and information on a location of the HNB;
a controller for, if the HNB is the first of the CSG to access a network, selecting a device establishing a connection with the HNB using the information on the location of the HNB; and
a transmitter for transmitting, to the HNB, an attachment response message including information on the device for establishing a connection between the selected device and the HNB and information necessary to establish an interface X2 for switching of HNBs in the CSG.

10. The OMC according to claim 9, wherein the controller selects a Mobile Management Entity (MME) or a Serving Gateway (S-GW) according to one of the location of the HNB, load balancing, and a rule of reducing a possibility of changing the MME or the S-GW when an user equipment (UE) moves,
wherein the information on the device indicates the selected MME or S-GW.

11. The OMC according to on claim 9, wherein if the HNB has not accessed the network in the CSG, the controller selects a Mobile Management Entity (MME) or a Serving Gateway (S-GW) selected by the OMC for other HNBs in the CSG as the device, and controlling the transmitter for transmitting, to the other HNBs, an attachment response message including information on the selected device.

12. The OMC according to claim 9, wherein the attachment response message includes an Internet Protocol (IP) address list of each of other HNBs in the CSG and information on other HNBs adjacent to the HNB.

13. A Home Node B (HNB) for establishing a connection, the HNB comprising:
a transceiver for transmitting an attachment request message including an identifier of a Closed Subscriber Group (CSG) where the HNB is located and information on a location of the HNB to an Operation and Maintenance Center (OMC), receiving an attachment response message including information on a device establishing the connection with the HNB selected using the information on the location of the HNB, and establishing a connection with the selected device,
wherein the attachment response message includes and information necessary to establish an interface X2 for switching of HNBs in the CSG.

14. The HNB according to claim 13, wherein the information on the device indicates information for a Mobile Management Entity (MME) or a Serving Gateway (S-GW) selected according to one of the location of the HNB, load balancing, and a rule of reducing a possibility of changing the MME or the S-GW when an user equipment(UE) moves.

15. The HNB according to claim 14, wherein if the information on the device indicates the MME, transmitting, a connection request message including an identifier of the HNB and an identifier of a Track Area Identifier (TAI) where the HNB is located, to the MME; and
receiving from the MME, a connection response message.

16. The HNB according to claim 15, wherein the connection request message includes information on cells which are overlapped with the HNB or the CSG.

* * * * *